US005707188A

United States Patent [19]
Longstreet

[11] Patent Number: 5,707,188
[45] Date of Patent: Jan. 13, 1998

[54] ADJUSTABLE SECURING DEVICE

[76] Inventor: Dean E. Longstreet, 830 W. Oak, Lebanon, Oreg. 97355

[21] Appl. No.: 551,523

[22] Filed: Nov. 1, 1995

[51] Int. Cl.$^6$ .................................................. F16M 13/00
[52] U.S. Cl. .......................... 410/96; 410/104; 24/135 A
[58] Field of Search ............................. 24/135 R, 135 A, 24/135 N; 224/499, 505; 410/96, 101, 104, 105, 106, 116

[56]  References Cited

U.S. PATENT DOCUMENTS

| D. 328,241 | 7/1992 | Longstreet | D8/383 |
|---|---|---|---|
| 2,372,635 | 4/1945 | Becket | 24/135 R |
| 4,139,017 | 2/1979 | Hamilton, Sr. et al. | 24/135 R |
| 4,407,477 | 10/1983 | Backlund et al. | 24/135 A |
| 4,969,784 | 11/1990 | Yanke | 410/104 |
| 4,992,015 | 2/1991 | Florence | 410/104 |

Primary Examiner—Karen B. Merritt
Assistant Examiner—Gregory A. Morse
Attorney, Agent, or Firm—Klarquist Sparkman Campbell Leigh & Whinston, LLP

[57]  ABSTRACT

An adjustable securing device for securing a flexible line in a selected position to an elongate member including a base with a threaded shaft projecting from one of the base's surfaces. A line lock is screwed onto the threaded shaft and is operable to clamp a flexible line against the base. A mounting member is mounted for shifting to selected positions along the elongated member. A locking device connects the base plate to the mounting member and secures the mounting member in a selected position on the elongate member.

13 Claims, 1 Drawing Sheet

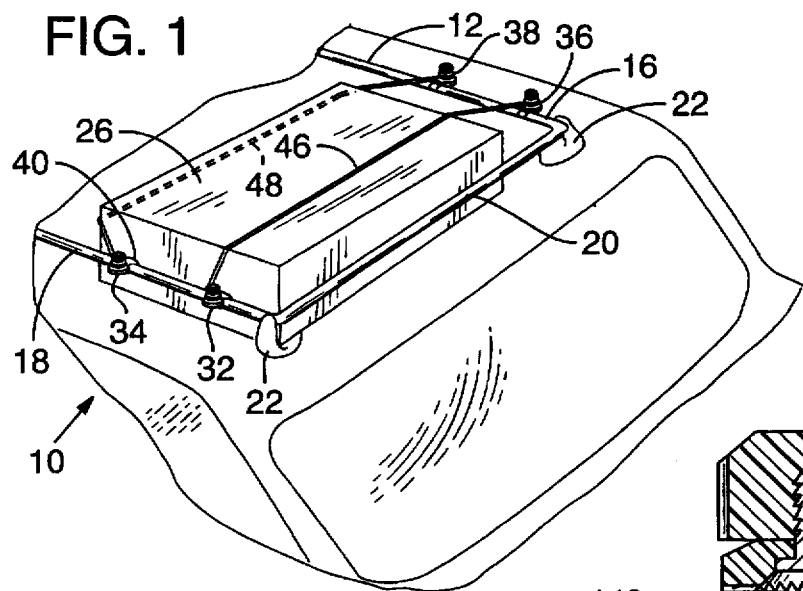
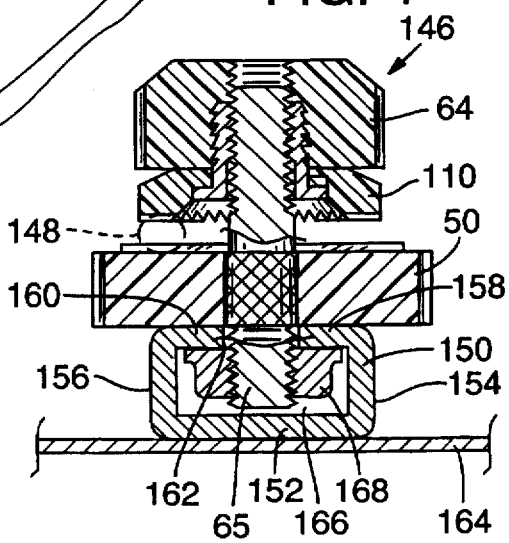
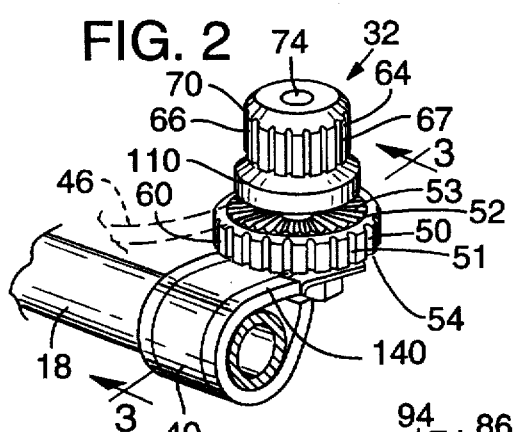
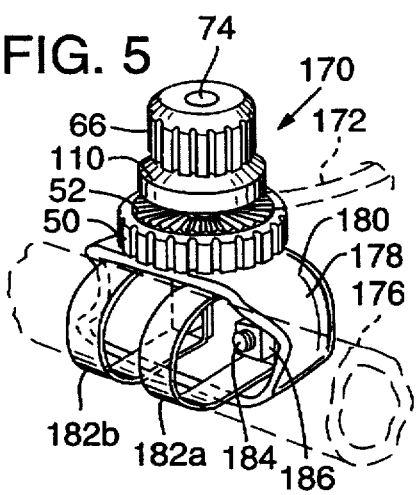
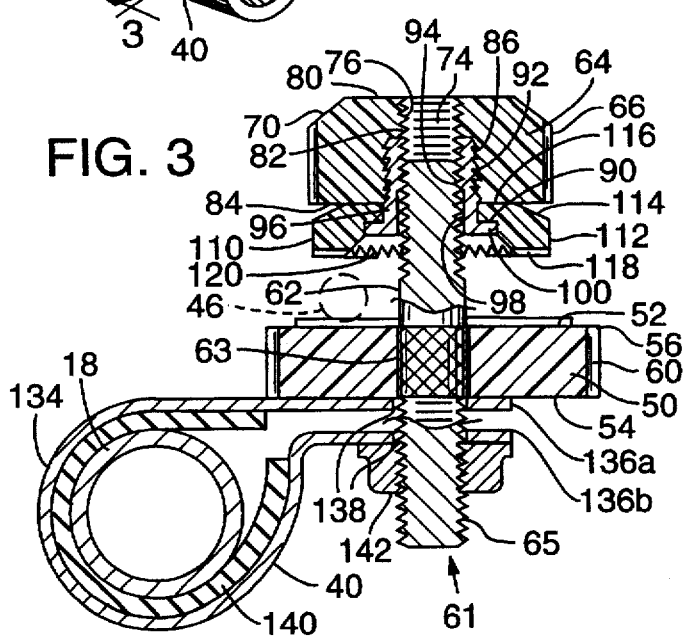

ADJUSTABLE SECURING DEVICE

FIELD OF THE INVENTION

This invention relates generally to securing devices and, more particularly, to an adjustable securing device adapted to attach a flexible line to an elongate member, such as a vehicular rack.

BACKGROUND OF THE INVENTION

It is often desirable and/or necessary to secure a flexible line in a selected position. Various means for securing the line have included knotting the line to a stationary item, wrapping the line around tie-down cleats, and pulling the line through spring-biased clamping jaws. Each of these has deficiencies, however. For example, knotting may not result in taut secured lines. Further, cleats, spring-biased clamping jaws and the like generally are stationarily positioned relative to the item to which the line is to be secured. Often, little, or no adjustability of the position of the tie-down element is provided.

One example of a need for an adjustable line-securing device is found on vehicles. Vehicles have limited space to comfortably seat passengers and carry additional articles. This holds true for vehicles ranging from passenger vans to motorcycles as well as other vehicles. Thus, specialized racks mounted outside of the vehicle have been designed to increase the carrying capacity of the vehicle.

There are many times, however, that a load needs to be transported for which no specialized racks exist. Examples of such objects include odd-shaped boxes and building supplies. In such a case, a flexible line, such as a rope, is used to tie the load to the vehicle.

In order to tie the flexible line to the vehicle and to generally support the load, standard racks can be mounted to the vehicle. These racks typically include two parallel elongated bars mounted on opposite sides of the vehicle roof with cross members extending therebetween.

There are several problems with tying a line to these racks, however. For example, it is difficult to tie a knot while maintaining tension on the flexible line. If the tension is inadequate, the load will not be properly secured. Additionally, the knots may loosen and become undone posing a danger. Moreover, the line has a tendency to slip along the length of the elongated bar thereby reducing tension in the line or allowing the load to shift.

Several attempts have been made to overcome these problems. One prior art design uses adjustable tie downs. These devices require a specially designed elongated bar that has an elongated slot along its length with a slidable nut mounted within the slot. The tie down screws onto the nut to secure it at different locations along the elongated bar. The flexible line can be inserted through an open eye in the tie down and is merely knotted to secure the line to the vehicle. It is still difficult, however, to maintain tension in the line while tying a knot. Additionally, tying knots are slow and prone to error. These devices also require a specially designed elongated bar, rather than being adaptable to the many varieties of elongate bars available in not only vehicular related components, but other areas where securing devices are needed.

Other available prior art devices for securing a line to a vehicle are designed to be bolted stationarily to the vehicle and work independently of the elongated bars. These devices have a threaded locking device that screws down on the flexible line. To use these prior art devices, however, one must drill mounting holes in the vehicle. Additionally, these devices are not adjustable along the length of the elongated bars. Often it is necessary to have a securing device that can move to different locations along the elongated bar so the load can be secured according to its unique shape.

As previously mentioned, tie down devices are also used in other applications. Sail boats, for example, use quick securing devices wherein the line is pulled through spring-biased jaws that clamp the line in place. These securing devices, however, generally are also fixed to the boat, usually by screws, and cannot adjust along an elongate bar as is needed in many applications. Further, by merely being spring-biased into contact with the line they may be released by forces imposed on the line.

An object of the present invention is to provide a line-securing device that can be secured at selected positions along the length of an elongate member.

Another object of the invention is to provide a securing device that is adapted to be mounted to a variety of types of elongated members.

Yet another object of this invention is to provide a securing device that will allow a flexible line to be quickly and firmly fastened while maintaining the line's tension.

A further object of the invention is to provide an adjustable line-securing device that does not require a knot to be tied in the flexible line.

SUMMARY OF THE INVENTION

The present invention provides a securing device that can easily and quickly secure a flexible line without having to use a knot and that can secure the line while the line is in tension. The securing device also is adjustably securable at selected positions along the length of an elongated member. The securing device is also adaptable for use with a variety of elongated members.

In a preferred embodiment of the invention, a base plate has a threaded shaft projecting from one of the base's surfaces. A line lock is screwed onto the threaded shaft and is operable to clamp a flexible line against the base. A mounting member is slidably mountable on an elongated member at selected positions along the length of the elongated member. A locking device connects the base plate to the mounting member and secures the mounting member in a selected position on the elongate member.

The securing device has several advantages. For example, the flexible line can be held in tension with one hand while the line lock is screwed down with the other hand to secure the flexible line. Additionally, the securing device can be mounted at selected positions along the elongated member. The securing device also is easily removable and transferable to other types of elongate members. Moreover, the securing device does not require permanent mounting holes.

The above described features of the present invention will be more readily apparent from the following detailed description of preferred embodiments with reference to the accompanying drawings.

BRIEF DESCRIPTION OF THE DRAWINGS

FIG. 1 is a perspective view of a portion of a vehicle having a load secured to the vehicle roof by two pairs of securing devices according to the invention with a flexible line extending between each pair.

FIG. 2 is an enlarged perspective view of a securing device mounted to a tubular elongated bar as shown in FIG. 1.

FIG. 3 is an enlarged cross-sectional view of the securing device shown in FIG. 2 taken along line 3—3.

FIG. 4 is a cross-sectional view of another embodiment of the present invention with a securing device mounted to a slotted elongated member.

FIG. 5 is a perspective view of another embodiment of the present invention with a securing device mounted to a tubular elongated member using a dual-strap clamp.

DETAILED DESCRIPTION OF THE PREFERRED EMBODIMENTS

Referring to FIG. 1, a portion of a vehicle 10 is shown with a roof rack 12 consisting of two elongated bars 16, 18 with a cross bar 20 connected between the ends of the elongated bars. Rack 12 is mounted to the vehicle roof with braces 22. A box or load 26 sits between elongated bars 16, 18 adjacent cross bar 20.

Four securing devices 32, 34, 36, 38 are mounted on elongate bars 16, 18 by clamps 40. Specifically, securing devices 32, 34 are spaced apart and mounted on elongate bar 18 and securing devices 36, 38 are spaced apart and mounted on bar 16o The securing devices are adjustable so that they may be secured at any selected position along the length of the elongated bars as will be further described. A flexible line, or rope, 46 is strapped across load 26 and held in tension by securing devices 32 and 36. A second flexible line, or rope, 48 is strapped across load 26 and held in tension by securing devices 34 and 38.

FIGS. 2 and 3 show securing device 32 in greater detail. Securing devices 34, 36, 38 shown in FIG. 1 are similar to device 32 and will not be separately described. Device 32 includes a disk-shaped base 50 having opposed face surfaces 52, 54. Surface 52 has ribs 53 thereon for gripping a flexible line, such as flexible line 46. The base 50 also includes an outer sidewall 51 with vertical grooves 60 therein to aid in gripping the base. An integral threaded rod 61 provides a threaded upper portion, or shaft, 62, an unthreaded knurled center portion 63, and a threaded lower portion, or shaft, 65. Base 50 has a centrally located bore and is secured to center portion 63 of rod 61 by suitable means so that upper portion, or shaft, 62 and lower portion, or shaft, 65 extend perpendicularly from the center of surfaces 52 and 54 respectively of base 50.

An operating knob 64 is screwed on upper threaded shaft 62. The knob has a cylindrical sidewall 66 having equally-spaced vertical grooves 67 therein for gripping and a tapered portion 70 which tapers inwardly from the cylindrical sidewall to a top 80 of the knob. The top is a flat circular section perpendicular to the threaded shaft 61 with a centrally located opening 74, which extends through the knob. Opening 74 has a threaded portion 76 from a top 80 of the knob to approximately a midpoint 82 of the knob's opening. From the midpoint to a bottom 84 of the knob's opening, the knob has an inner wall 86 with a larger diameter than threaded portion 76.

An assembly member, or element, 90 is preferably a pre-molded threaded insert having a metal cylindrical body with an outer serrated top wall 92 designed to mate with inner wall portion 86 of knob 64 with a pressure fit so that the two are securely locked together to operate as one. The assembly member has an upper internally threaded bore 94 that is coextensive with threaded portion 76 of opening 74 to form a threaded bore extending through knob 64. The assembly member also has an intermediate portion 96 that has a smooth periphery and a lower unthreaded pilot hole 98 for guiding the knob 64 onto the threaded shaft. An annular flange 100 of a diameter greater than intermediate portion 96 extends radially outwardly from the bottom of the intermediate portion.

A line engaging member 110 is loosely and rotatably mounted on assembly member 90 and is held in place between the knob and the base by annular flange 100 of the assembly member 90. The line engaging member includes a cylindrical side wall 112 and a tapered upper section 114 which has a top 116 in sliding contact with bottom 84 of knob 64. Thus, the line engaging member can move up and down on upper threaded shaft 62 with knob 66 and assembly member 90, but also can rotate independently of the knob 64 and assembly member 90. The bottom 118 of the line engaging member has radially extending ribs 120 thereon to engage a flexible line 46, as shown in dashed line in FIG. 3.

A flexible clamp 40 has a metal C-shaped portion 134 that encircles elongate member 18 and two normally spaced-apart flanged end portions 136a, 136b. The end portions have openings 138 therethrough through which lower threaded shaft 65 extends. A rubber lining 140 is secured to the inner wall of clamp 132 to create a frictional contact between elongate member 18 and the clamp.

A nut 142 is screwed to lower threaded shaft 65 to urge flanged end portions 136a, 136b of clamp 132 together to frictionally mount the clamp to elongate member 18 at any selected position along the length of the elongated member.

FIG. 4 shows a second embodiment of the invention with a securing device 146 adapted to secure a line 148. The securing device is similar in most respects to that already described in FIGS. 2 and 3. The securing device differs from the previously described embodiment, however, in both the elongate member used and the means for mounting to the elongate member.

Elongate member 150, which also may be mounted atop a vehicle as previously described, or mounted flush on the vehicle roof 164 as shown, has a channel-shaped cross-section. The elongate member has a bottom portion 152, two upright side portions 154, 156 extending upwardly from bottom portion 152, and two inwardly turned flanges 158, 160 perpendicular to the side portions. Flanges 158, 160 are spaced apart to define an elongate opening, or slot, 162. Bottom portion 152 is mounted to a surface 164. The elongate member defines an elongate channel 166 therein in which a nut 168 is slidably movable. The channel is in open communication with slot 162 so that lower threaded shaft 65 of securing device 146 may extend through the slot and screw onto nut 168 to mount the securing device to elongate member 150 at any desired location along the length of the elongate member.

FIG. 5 shows yet another embodiment of the invention with a securing device 170 mounted to an elongate member 176 and adapted to secure a line 172. In this case, the securing device includes a dual-strap clamp 178. The clamp 178 has a body 180 to which two adjustable straps 182a, 182b are mounted using bolts 184 and nuts 186, one bolt and nut for each strap. The straps encircle elongate member 176 and are secured thereto with a friction fit. Lower threaded shaft 65 is secured to clamp 178 by a nut (not shown).

In operation, the securing device is mounted to an elongate member at a desired position using the clamp or nut assembly already described. Loosening of the clamp or nut allows the device to be moved to desired positions longitudinally of the elongate member. Tightening of the clamp or nut secures it in place on the elongate member.

Tightening or loosening of the clamp or nut can be accomplished through rotation of base 50. The base has several features that allow it to be easily gripped and rotated. For example, base 50 has a greater diameter than knob 64 or line engaging member 110. This allows a user to grab the base without interference from other components on the securing device. Additionally, the base has grooves 60 in its outer surface and is of a size for easy gripping. Consequently, the base can be easily screwed onto any of the mounting members described, such as a flexible clamp or a nut in a channeled elongate member. The flexible line 46 is placed between surface 52 of base 50 and line engaging member 110 (see FIG. 3) and drawn tight by the user's one hand. Knob 64 is turned clockwise by the user's other hand, causing the knob and the line engaging member to both move toward line 46. Once ribs 120 of the line engaging member come into frictional contact with the line, the line engaging member ceases rotating, since it is capable of rotating independently of the knob. The knob, however, continues to be rotated to cause the line engaging member to clamp onto the line. Ribs 53 on base 50 and ribs 120 on line engaging member 110 ensure that the line will not slip once clamped.

To disengage flexible line 46 from line securing device 32, the knob is rotated in a counterclockwise direction. The line engaging portion will not rotate while in frictional contact with the line. This allows the securing device to be more easily released, rather than having to overcome the frictional force between the line engaging portion and the line.

Having described and illustrated the principles of our invention with reference to preferred embodiments thereof, it will be apparent that these embodiments can be modified in arrangement and detail without departing from the principles of the invention.

For example, although the elongate member was primarily shown as that connected to a vehicle, it will be apparent to one skilled in the art that the elongate member may be used in other applications. For example, the elongate member may be mounted to a motorcycle, trailer, sailboat, or any other device where a securing device is needed.

Additionally, while some examples of mounting members are shown (such as a C-shaped clamp) to mount the base and knob assembly to various types of elongate members, other mounting members are possible and can be used in conjunction with the invention as described. For example, an odd-shaped elongate member might require a mounting member such as a sleeve that is fastened to the elongate member with a screw, wedge, or crimping type device. The knob/base assembly may then be secured to the sleeve. Other alternatives exist.

In view of the wide variety of embodiments to which the principles of our invention can be applied, it should be apparent that the detailed embodiments are illustrative only and should not be taken as limiting the scope of my invention. Rather, I claim as my invention and all such modifications as may come within the scope of the following claims and equivalence thereto.

I claim:

1. An adjustable securing device for releasably attaching a flexible line to an elongate member comprising:

a mounting member adapted for mounting on the elongate member and for shifting to selected positions longitudinally therealong, a base having a first surface and an opposed second surface with a threaded shaft projecting from the first surface, a line lock screwed on the shaft operable to clamp a flexible line against the base, a locking device for connecting the base to the mounting member and releasably securing the mounting member in a selected position on the elongate member;

wherein said mounting member comprises a flexible clamp adapted to be fit about the elongate member having portions which may be urged into frictional contact with the elongate member; and wherein said clamp comprises a pair of normally spaced-apart facing flange end portions and said locking device comprises inter-engaged threaded elements operable to urge said flange end portions toward each other.

2. The device of claim 1, wherein the line lock comprises a knob portion screwed onto said threaded shaft for movement toward and away from the base upon rotation and a line engaging portion intermediate the knob portion and base.

3. The device of claim 2, wherein the line engaging portion is loosely connected to said knob for moving with said knob toward and away from said base without rotation.

4. The device of claim 1, wherein said mounting member comprises a clamp having portions adapted to engage spaced portions of the elongate member and to be urged into frictional contact therewith.

5. The device of claim 1, wherein one of said threaded elements is a second threaded shaft extending outwardly from the second surface of said base.

6. An adjustable securing device for releasably attaching a flexible line to an elongate member comprising:

a mounting member adapted for mounting on the elongate member and for shifting to selected positions longitudinally therealong, a base having a first surface and an opposed second surface with a first threaded shaft projecting from the first surface, a line lock screwed on the first shaft operable to clamp a flexible line against the base, a locking device for connecting the base to the mounting member and releasably securing the mounting member in a selected position on the elongate member; and wherein the elongate member includes an elongate slot formed therein, said mounting member comprises a nut mounted on one side of said slot and said locking device comprises a second threaded shaft extending outwardly from said second surface of said base screwed into said nut to frictionally secure said nut in a selected position relative to the elongate member.

7. An adjustable securing device for releasably attaching a flexible line to an elongate member comprising:

a mounting member adapted for mounting on the elongate member and for shifting to selected positions longitudinally therealong, a base having a first surface and an opposed second surface with a first threaded shaft projecting from the first surface, a line lock screwed on the first shaft operable to clamp a flexible line against the base, a locking device for connecting the base to the mounting member and releasably securing the mounting member in a selected position on the elongate member; and wherein the elongate member includes a channel member having an elongate slot formed along one side thereof, said mounting member comprises a nut slidably mounted in said channel and said locking device comprises a second threaded shaft extending outwardly from said second surface of said base screwed into said nut to frictionally secure said nut in a selected position relative to the channel member.

8. An adjustable securing device for releasably attaching a flexible line to an elongate member comprising:
- a mounting member adapted for mounting on the elongate member and for shifting to selected positions longitudinally therealong,
- a base having a first surface and an opposed second surface with a threaded shaft projecting from the first surface,
- a line lock screwed on the shaft operable to clamp a flexible line against the base, and
- a locking device for connecting the base plate to the mounting member and releasably securing the mounting member in a selected position on the elongate member, and
- wherein the line lock has an opening therethrough having a threaded portion and an unthreaded portion, the unthreaded portion being adapted to slidably engage the threaded shaft and align the line lock thereon.

9. An adjustable load securing device for a vehicle comprising:
- an elongate member for mounting on the vehicle,
- a mounting member adapted for mounting on the elongate member and for shifting to selected positions longitudinally along the elongate member,
- a base having a first surface and an opposed second surface with a threaded shaft projecting from the first surface,
- a line lock screwed on the shaft operable to clamp a flexible line against the base, and
- a locking device for connecting the base to the mounting member and releasably securing the mounting member in a selected position on the elongate member; and
- wherein the elongate member is tubular and the mounting member includes dual straps adapted to surround the elongate member and clamp thereto.

10. An adjustable load securing device for a vehicle comprising:
- an elongate member for mounting on the vehicle,
- a mounting member adapted for mounting on the elongate member and for shifting to selected positions longitudinally along the elongate member,
- a base having a first surface and an opposed second surface with a first threaded shaft projecting from the first surface and a second threaded shaft projecting from the second surface,
- a line lock screwed on the first threaded shaft operable to clamp a flexible line against the first surface of the base, and
- a locking device screwed on the second threaded shaft of the base for connecting the base to the mounting member and releasably securing the mounting member in a selected position on the elongate member.

11. The device of claim 10, wherein the elongate member includes an elongate slot formed along one side thereof, said mounting member comprises a nut slidably mounted in said slot and said nut is screwed onto said second threaded shaft to frictionally secure said nut in a selected position relative to the elongate member.

12. The device of claim 10, wherein the elongate member is tubular and the mounting member is a clamp adapted to be fit about the elongate member and includes portions which may be urged into frictional contact with the elongate member.

13. The adjustable load screwing device of claim 10 wherein the locking device urges the mounting member into contact with the second surface of the base.

* * * * *